United States Patent [19]

Bowen et al.

[11] 4,452,945
[45] Jun. 5, 1984

[54] CROSSLINKABLE COATING COMPOSITIONS CURED BY A SPECIFIED BLEND OF ALKYLARYLSULPHONIC ACIDS

[75] Inventors: Thomas N. E. Bowen, Hilden, Fed. Rep. of Germany; Peter Butler; Auguste L. L. Palluel, both of Slough, England

[73] Assignee: Imperial Chemical Industries PLC, London, England

[21] Appl. No.: 372,165

[22] Filed: Apr. 26, 1982

[30] Foreign Application Priority Data

Apr. 28, 1981 [GB] United Kingdom ............... 8113047
Jul. 23, 1981 [GB] United Kingdom ............... 8122691

[51] Int. Cl.$^3$ .................... C08L 61/28; B32B 15/08
[52] U.S. Cl. ................................ 525/161; 427/388.3; 427/409; 428/458; 428/460; 428/461; 428/463; 428/464; 428/502; 525/162

[58] Field of Search ............. 525/161, 162, 327.3, 525/328.8; 428/460; 427/388.3

[56] References Cited

U.S. PATENT DOCUMENTS 4,276,212  6/1981  Khanna et al. .................. 525/162

*Primary Examiner*—Theodore E. Pertilla
*Attorney, Agent, or Firm*—Cushman, Darby & Cushman

[57] ABSTRACT

Coating compositions capable of curing at or near to room temperature comprise 90–50% by weight of a specified hydroxyl group-containing addition polymer, 10–50% by weight of an alkylated melamine-formaldehyde crosslinking agent and an acid catalyst consisting of a blend of a $C_{1-4}$ alkylated arylsulphonic acid and a $C_{8-14}$ alkylated arylsulphonic acid in amounts such that the —$SO_3H$ group content is 0.70–2.1% of the total weight of the addition polymer and the crosslinking agent. The compositions are particularly suitable for the refinishing of automobile bodies.

11 Claims, No Drawings

CROSSLINKABLE COATING COMPOSITIONS CURED BY A SPECIFIED BLEND OF ALKYLARYLSULPHONIC ACIDS

This invention relates to curable coating compositions based upon a hydroxyl group-containing addition polymer and an alkylated melamine-formaldehyde resin as crosslinking agent, in particular to such compositions which have the property that, subsequent to the blending together of the constituents, they are capable of curing at substantially room temperature.

Coating compositions containing as the principal constituents a hydroxyl group-containing addition polymer, e.g. an acrylic resin, and an aminoplast resin, such as an alkylated melamine-formaldehyde condensate, are very well known and are described in a large number of patent specifications, of which there may be mentioned as examples U.K. Specifications Nos. 1,009,217, 1,251,772 and 1,266,159. The majority of these compositions are of the thermosetting type, that is to say they require for their curing the application of heat, at temperatures from 80° C. upwards, more usually from 120° C. upwards, otherwise the crosslinking process takes place too slowly for practical purposes. In many cases, the curing process is assisted by the addition of a suitable catalyst, usually a strong acid such as p-toluenesulphonic acid. For certain end-uses, however, it is not convenient to have to apply heat in order to cure the composition. An instance of such an end-use is in the refinishing of automobile bodies, where it is much to be preferred that repair of localised damage to the paintwork occasioned either during manufacture or in subsequent use of the vehicle can be effected at room temperature.

It is well known to bring about the crosslinking of hydroxyl group-containing polymers by the alternative use as crosslinking agent of a diisocyanate, and coating compositions based upon these two main constituents normally cure satisfactorily without any external application of heat. However, the toxicity of diisocyanates may be a substantial disadvantage of such compositions in certain circumstances, particularly in the automobile refinishing trade where it may be difficult to provide adequately ventilated working conditions.

There have been proposed, in British Patent Specification No. 1,577,998, coating compositions comprising a hydroxyl group-containing acrylic resin of specified characteristics together with an aminoplast resin and an acid catalyst of conventional type, which are stated to cure at lower temperatures than those mentioned above for most crosslinking systems of this kind, namely temperatures in the range 60° to 80° C. However, such compositions provide only a partial answer to the problem of eliminating the need to apply heat for curing.

We have now developed a crosslinking coating composition, particularly intended for automobile refinish applications, which is based upon a combination of a hydroxyl group-containing addition polymer with a specified class of aminoplast resin catalysed by a specific blend of acids, and which exhibits an excellent rate of cure at or near room temperature.

According to the invention there is provided a coating composition comprising:

(i) from 90% to 50% by weight of a hydroxyl group-containing addition polymer obtained by the copolymerisation of $\alpha,\beta$-ethylenically unsaturated monomers including at least one hydroxyalkyl ester of an $\alpha,\beta$-ethylenically unsaturated carboxylic acid;

(ii) from 10% to 50% by weight of a crosslinking agent consisting of a substantially fully alkylated melamine-formaldehyde reaction product in which the alkyl groups contain from 1 to 4 carbon atoms; and (iii) an acid catalyst consisting of a blend of an alkylated aryl sulphonic acid in which the or each alkyl group contains from 1 to 4 carbon atoms and an alkylated arylsulphonic acid in which the or each alkyl group contains from 8 to 14 carbon atoms, such that the total content of sulphonic acid ($-SO_3H$) group is in the range 0.70% to 2.1% of the total weight of constituents (i) and (ii).

Suitable hydroxyl group-containing polymers include in particular the acrylic resins obtained by the polymerisation of at least one hydroxyalkyl ester of acrylic acid or methacrylic acid, preferably in conjunction with one or more alkyl esters of acrylic acid or methacrylic acid or other copolymerisable monomers free from hydroxyl groups.

Examples of suitable hydroxyl group-containing monomers include 2-hydroxyethyl acrylate, 2-hydroxyethyl methacrylate, 2-hydroxypropyl acrylate, 2-hydroxypropyl methacrylate, hydroxyisopropyl acrylate, hydroxyisopropyl methacrylate and commercially available mixtures of these monomers, as well as 4-hydroxybutyl methacrylate.

Examples of suitable hydroxyl-free monomers include the alkyl acrylates and methacrylates such as ethyl acrylate, butyl acrylate, 2-ethylhexyl acrylate, methyl methacrylate, ethyl methacrylate and butyl methacrylate, and vinylaromatic compounds such as styrene and vinyl toluene. There may also be included minor proportions of vinyl esters such as vinyl acetate and vinyl propionate, and of acrylonitrile or methacrylonitrile.

There may also, if desired, be included, in the monomers from which the hydroxyl group-containing polymer (i) is derived, a carboxylic group-containing monomer; suitable ethylenically unsaturated carboxylic acids include in particular acrylic acid, methacrylic acid, crotonic acid and itaconic acid, and also maleic acid and fumaric acid. The incorporation in this way of carboxylic groups into the polymer (i) may, for example, assist the dispersion of pigments into the coating composition.

A particular class of hydroxyl group-containing polymers which are suitable for use in compositions according to the invention are those obtained by the copolymerisation of:

(a) a monomer which is the 1:1 molar adduct either of an $\alpha,\beta$-ethylenically unsaturated carboxylic acid with the glycidyl ester of a tertiary aliphatic carboxylic acid or of the glycidyl ester of an $\alpha,\beta$-ethylenically unsaturated carboxylic acid with a tertiary aliphatic carboxylic acid, (b) a hydroxyalkyl ester of an $\alpha,\beta$-ethylenically unsaturated carboxylic acid and (c) one or more $\alpha,\beta$-ethylenically unsaturated monomers free from hydroxyl groups, the said adduct being formed before, during or after the copolymerisation reaction The monomer adduct (a) from which this class of hydroxyl group-containing copolymer is in part derived results from one or other of the following reactions:

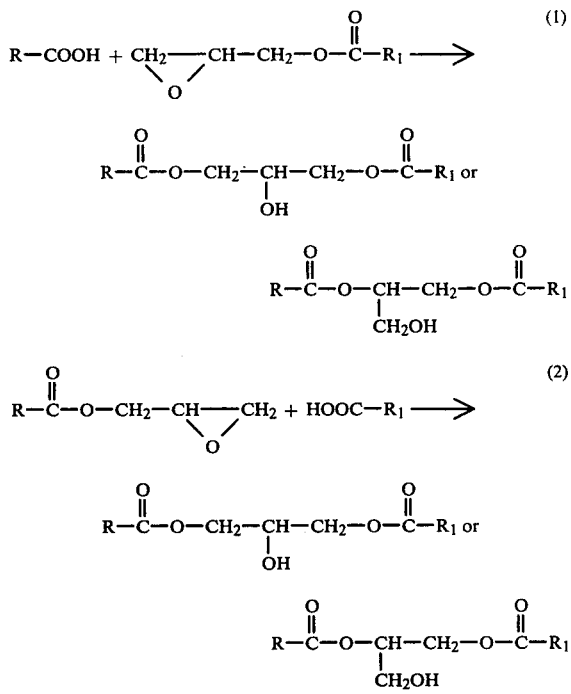

where R represents an ethylenically unsaturated grouping and $R_1$ represents a tertiary aliphatic group. Preferably R is the grouping

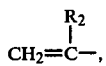

where $R_2$ is either hydrogen or methyl, and preferably $R_1$ is the grouping

where $R_3$, $R_4$ and $R_5$ are individually straight chain alkyl groups containing from 1 to 12 carbon atoms provided that the grouping $R_1$ as a whole contains from 4 to 26 carbon atoms.

In the case where the monomer adduct (a) is formed by means of the reaction (1) above, examples of suitable ethylenically unsaturated carboxylic acids include those which have been mentioned above; an example of a suitable glycidyl ester of a tertiary aliphatic carboxylic acid is the product sold by the Shell Chemical Company under the name "Cardura" E ("Cardura" is a Registered Trade Mark), represented by the above formula where $R_1$ is a mixture of saturated tertiary aliphatic hydrocarbon radicals containing from 8 to 10 carbon atoms.

In the case where the monomer adduct (a) is formed by means of the reaction (2) above, examples of suitable glycidyl esters of ethylenically unsaturated carboxylic acids include glycidyl acrylate and glycidyl methacrylate, and an example of a suitable tertiary aliphatic carboxylic acid is the product sold by the Shell Chemical Company under the name "Versatic" acid ("Versatic" is a Registered Trade Mark), which is a mixture of saturated tertiary aliphatic carboxylic acids containing from 9 to 11 carbon atoms.

The 1:1 addition reaction of the carboxylic acid with the glycidyl compound can in either case conveniently be effected, with good conversion of the reactants, at a temperature in the range 80°–160° C. for a period of from 5 minutes to 8 hours. Where the adduct (a) is to be formed before the polymerisation step, the carboxylic acid and the glycidyl compound are suitably pre-reacted under these conditions and the product subsequently copolymerised with the monomers (b) and (c). Where the polymerisation step is itself performed under the stated temperature and time conditions, however, pre-reaction of the carboxylic acid with the glycidyl compound is not essential and the formation of the adduct and the copolymerisation can conveniently be carried out simultaneously. As the third alternative, the unsaturated component of the adduct, whether the carboxylic acid or the glycidyl compound, can first of all be copolymerised with the monomers (b) and (c), and the resulting copolymer then reacted with the other component under the stated conditions.

Suitable monomers (b) and (c) include those hydroxyl group-containing monomers and hydroxyl-free monomers which have been mentioned above. Here also there may be included, in the monomers being polymerised, a carboxyl group-containing monomer such as any of the unsaturated carboxylic acids mentioned above; when present, such monomer is additional to any unsaturated carboxylic acid which has been employed in the production of the adduct (a), as described above.

The proportions of the monomers (a), (b) and (c), and of any carboxyl group-containing monomer included, which are employed in the production of the addition polymer (i) may vary considerably, depending upon the characteristics desired in the coating ultimately obtained and upon the actual identities of the monomers selected, and it is therefore difficult to state any generally applicable ranges of values However, an important characteristic of the addition polymer in relation to its crosslinking potential, is its hydroxyl value and this preferably lies in the range 70–200 mg KOH/g (based on 100% non-volatiles), more preferably in the range 100 to 160 mg KOH/g. The skilled person will readily be able to adjust the proportions of the selected monomers accordingly. Another characteristic of the addition polymer which is relevant to its film-forming potentiality is its glass transition temperature (Tg). This should lie in the range −20° C. to +40° C., preferably −10° C. to +30° C. Yet another relevant characteristic is the molecular weight of the addition polymer; this preferably lies in the range 5,000–30,000, more preferably 10,000–15,000 (values of $\overline{M}_\omega$, as determined by gel permeation chromatography), so as to give a satisfactory compromise between the achievement of good mechanical properties in the desired coating and the avoidance of excessively high composition viscosity at conventional film-forming solids contents.

Suitable melamine-formaldehyde reaction products for use as the crosslinking component (ii) of the composition of the invention are those in which not less than 80% of the methylol groups or amino groups present have been alkylated with $C_{1-4}$ alkyl groups. These include "monomeric" reaction products containing in the molecule a single triazine nucleus, viz. pentamethoxymethyl-hydroxymethylmelamine and hexamethoxymethylmelamine, and more highly condensed analogues containing two or more triazine nuclei linked together by methylene groups. The preferred reaction products are those consisting predominantly of "monomeric" methylated material, especially those of which the chief constituent is hexamethoxymethylmelamine (the commercially available products are normally mixtures). Examples of these are "Cymel" 300, 301 and 303 ("Cymel" is a Registered Trade Mark of the Cyanamid Co. Ltd).

Preferably the coating compositions of the invention comprise from 80-55% by weight of the addition polymer (i) and from 20-45% by weight of the crosslinking agent (ii).

Suitable acid catalysts of the class of alkylated arylsulphonic acids in which the or each alkyl group contains from 1 to 4 carbon atoms (hereinafter referred to as lower alkylated arylsulphonic acids) include p-toluenesulphonic acid (usually available in the form of its monohydrate), xylenesulphonic acids, ethylenebenzenesulphonic acids and methylnaphthalenesulphonic acids. The preferred member of this class is p-toluenesulphonic acid. Suitable catalysts of the class of alkylated arylsulphonic acids in which the or each alkyl group contains from 8 to 14 carbon atoms (hereinafter referred to as higher alkylated arylsulphonic acids) include p-octylbenzenesulphonic acid and p-dodecylbenzenesulphonic acid. Preferably the or each alkyl group contains from 10 to 13 carbon atoms and, more preferably, is branched rather than linear. Members of this class which are especially useful include p-dodecylbenzenesulphonic acid, the commercially available $C_{13}$ branched-chain alkylbenzenesulphonic acid known as "Arylan SL 60" ("Arylan" is a Registered Trade Mark of Lankro Chemical Co. Ltd), and the di($C_9$-alkylated)-naphthalenedisulphonic acid known as "Nacure" 155 ("Nacure" is a Registered Trade Mark of King Industries). A preferred acid catalyst blend for use in the compositions of the invention consists of p-toluenesulphonic acid monohydrate and "Arylan SL 60".

As already stated, the amount of the acid catalyst blend used in the composition of the invention should be such that the total content of sulphonic acid ($-SO_3H$) group lies in the range 0.70% to 2.1% of the combined weight of the addition polymer (i) and the crosslinking agent (ii). Within these limits, the relative proportions of the lower alkylated arylsulphonic acid and the higher alkylated arylsulphonic acid may be varied, but the merit of the invention is that it does not depend, for the achievement of room temperature curing, as compared with the high temperature curing of the prior art, upon simply increasing the proportion used of the lower alkylated arylsulphonic acid. Such increase leads to a deterioration in the performance of the composition in other respects, for example to a loss of gloss in the coating films derived from it. The invention achieves the required enhancement of catalytic activity without this penalty being incurred, by incorporating the higher alkylated arylsulphonic acid. In practice, for satisfactory curing at around room temperature, the proportion of the lower alkylated arylsulphonic acid should be in the region of 1.5% by weight based on the total film-forming solids content of the composition, but it should not be higher than about 3% by weight for the reasons given. When moderately elevated curing temperatures are envisaged (e.g. "low-bake" at 60°-80° C.) a proportion of the lower alkylated arylsulphonic acid in the region of 0.8% is likely to suffice. The proportion of the higher alkylated arylsulphonic acid is then selected so as to afford an acceptable rate of cure of the composition; normally this will be appreciably greater than the proportion of the lower alkylated acid. For general guidance, it can be said that, in the case of the preferred acid blend consisting of p-toluenesulphonic acid monohydrate and the $C_{13}$ branched-chain acid referred to above, the first of these constituents will be present in an amount of from 0.2% to 3%, and the second constituent in an amount of from 2% to 6% based on the total film-forming solids content of the composition. Typical proportions of the first and second constituents for a room temperature-curing system are in the region of 1.5% and 4.5%, corresponding to a total $-SO_3H$ group content of about 1.7% of the total weight of film-former.

In preparing the coating composition of the invention for use, the three separate components (i), (ii) and (iii) may if desired be blended all together immediately before the composition is required, but alternatively the composition may be formulated as a two-pack system, one pack consisting of components (i) and (ii) together and the other pack consisting of component (iii) and the two packs being blended immediately before use. Although the potlife of a blend of (i) and (iii) may be several weeks, it is generally preferable not to formulate these two components together in a two-pack version. The complete composition, after blending, may have a useful potlife of several days, depending on the overall formulation.

The composition, or any sub-combination of its components, may incorporate one or more solvents such as are conventional in crosslinking acrylic coating systems, for the purpose of bringing the viscosities of the components into a range convenient for their being blended together and also in order to impart appropriate application characteristics to the composition as a whole. Suitable solvents include aliphatic, alicyclic and aromatic hydrocarbons, esters, ethers and ketones. In particular, the acid catalyst is conveniently carried in a solvent, but care should be exercised in selecting it since certain solvents (e.g. methyl isobutyl ketone) tend to resinify and discolour in the presence of strong acids.

It will be understood that there may be used in the composition, instead of a single hydroxyl group-containing addition polymer (i), a mixture of two or more such constituents. Whilst one such polymer may form part of the main film-forming material of the composition, another such polymer present may be capable of acting, for example, as a pigment dispersant or as a modifier of the properties of the resulting coating. Furthermore, there may be included in the composition film-forming material not of the addition polymer type, such as nitrocellulose or cellulose acetate butyrate; where, as in the case of cellulose acetate butyrate, such material contains hydroxyl groups, it may be desirable to increase the amount of the crosslinking agent (ii) above that required to react with the addition polymer or polymers, in order that the material in question also is covalently bound into the final coating.

Instead of a single crosslinking agent (ii), there may be employed a mixture of two or more such agents.

In addition to the components already discussed, and optionally solvent, the compositions of the invention may contain conventional ingredients such as pigments, fillers and plasticisers. Various types of pigment may be incorporated, amongst which may be mentioned inorganic pigments such as metal oxides and chromates, e.g. titanium dioxide, iron oxide, chromium oxide and lead chromate, organic pigments such as phthalocyanine blue and phthalocyanine green, carbazole violet, anthrapyrimidine yellow, flavanthrone yellow, isoindoline yellow and quinacridone violet, carbon black and metallic flake, e.g. of copper or aluminium. Suitable fillers include kaolin, china clay and talc. Pigments or fillers may conveniently be incorporated into either or both of the addition polymer component (i) and the crosslinking agent (ii). It will be appreciated, however, that the use should be avoided of pigments or fillers, e.g. calcium carbonate, which are liable to react with the acid catalyst blend.

The total film-forming solids content of the compositions of the invention (i.e. including pigments or fillers) typically range from 25% to 45% by weight at application; more particularly, in metallic pigmented compositions, the solids contents will normally be in the range 30–35% and, in solid colour compositions, in the range 35–40%.

The compositions may be applied to a substrate by any of the known techniques such as brushing or spraying.

Compositions containing in the region of 2% of the lower alkylated arylsulphonic acid catalysts give films which become tack-free after about 20 minutes at room temperature and are fully cured after 12–24 hours, depending on the concentration of acids used. At somewhat elevated curing temperatures (e.g. "low-bake" at 60° C.), full cure may be attained in 30 minutes with a lower level of the lower alkylated arylsulphonic acid catalyst. The use of high curing temperatures, e.g. in the region of 130° C., such as are conventional for known thermosetting coating compositions, is, however, quite unnecessary. The coating films thus obtained have a high degree of gloss.

A further advantage which the invention provides may be described as follows. Reference has already been made to room temperature-curing compositions based upon hydroxyl group-containing polymers and diisocyanates. For applications where appropriate precautions in the handling of diisocyanates can readily be taken, full colour ranges of pigmented compositions of this type are normally commercially available. For cases where the application conditions make it difficult to observe these precautions, on the other hand, it is much to be desired that it should be possible to change to the present mode of curing the polymer, by means of an aminoplast resin in the presence of an acid catalyst, whilst reproducing closely the colour of a given isocyanate-cured composition utilising the same polymer without the need to reformulate the pigmentation of the composition. In practice, it is found that the substitution of diisocyanate curing by acid-catalysed aminoplast resin curing leads to an appreciable difference of colour in the case where the acid catalyst used is the conventional lower alkylated arylsulphonic acid, such as p-toluenesulphonic acid. Surprisingly, however, we find that, if the catalysis is effected by a blend of acid catalysts, as called for by the present invention, the resulting coating is a very close colour match to that from the corresponding isocyanate-cured composition.

The invention is illustrated but not limited by the following Example, in which parts are by weight.

EXAMPLE 1

This Example illustrates a light-blue room temperature-curing paint according to the invention.

Preparation of Acrylic Resin Solution (A)

To a 10 l. flask fitted with a mechanical stirrer, thermometer of sufficient length to dip into the charge, a sample tube, a reflux condenser, a tube for making liquid additions and a tube for introducing nitrogen to provide an inert gas blanket, there were charged:

| | |
|---|---|
| Xylene | 1950 g |
| Ethoxyethanol | 975 g |

The temperature of the charge was raised to 140° C., and the following mixture was pumped in at a steady rate over a period of 3 hours via the liquid additions tube:

| | |
|---|---|
| Methyl methacrylate | 990 g |
| Styrene | 390 g |
| 2-Hydroxyethylmethacrylate | 900 g |
| Acrylic acid | 355 g |
| "Cardura" E | 1265 g |
| t-Butylperbenzoate | 75 g |

The temperature was maintained at 138°–142° C. throughout the addition, and for a further 2 hours thereafter. The charge was allowed to cool, and then decanted. The characteristics of the resin solution thus produced were measured, with the following results:

| | |
|---|---|
| Solids content | 59.2% by weight |
| Acid value | 10.2 mg KOH/gram of solid resin |
| Hydroxyl value | 151 mg KOH/gram of solid resin |
| Viscosity | 28 poise at 25° C. |
| Reduced viscosity* | 0.10 dl/g. |

*as given by the expression $$\frac{\text{(flow time of solution)} - \text{(flow time of solvent)}}{\text{(flow time of solvent)} \times \text{(concentration of solution in g/100 ml)}}$$

as measured in an Ostwald U-tube viscometer at a concentration of 0.5 g of solid resin in 100 ml of solution in a 95:5 mixture of 1:2-dichloroethane and ethanol.

Preparation of Pigment Dispersion (B)

A white pigment dispersion was made by ball-milling titanium dioxide pigment with a solution of an acrylic dispersing resin in xylene. A blue pigment dispersion was likewise made by ball-milling indanthrone blue pigment with a solution of acrylic dispersing resin. These two dispersions were then blended together with additional dispersing resin to produce a light blue pigment dispersion having the composition:

| | Parts by weight |
|---|---|
| Titanium dioxide pigment | 54.65 |
| Indanthrone blue pigment | 1.40 |
| Acrylic dispersing resin (solids) | 12.97 |
| Xylene | 30.98 |
| | 100.00 |

Preparation of clear Blending Solution (C)

The following components were mixed together thoroughly:

| | Parts by weight |
|---|---|
| Acrylic resin solution (A) | 62.86 |

|  | Parts by weight |
|---|---|
| as described above | |
| Acrylic dispersing resin, (as described in Example 2 of British Specification No. 1393243; 50% solids in xylene) | 18.85 |
| Flow control additives | 1.17 |
| Butyl acetate | 8.56 |
| Xylene | 8.56 |
|  | 100.00 |

Preparation of Light Blue Paint Base (D)

The following components were cold-blended:

|  | Parts by weight |
|---|---|
| Pigment dispersion (B) as described above | 177.0 |
| Acrylic resin solution (A) as described above | 153.0 |
| Flow control additives | 3.4 |
| Butyl acetate | 15.3 |
| Xylene | 15.3 |
| Clear blending solution (C) as described above | 636.0 |
|  | 1000.0 |

Preparation of Room-Temperature-Curing Paint

The following ingredients were mixed together in the order given:

|  | Parts by weight |
|---|---|
| Light blue paint base (D) as described above | 100.00 |
| Clear blending solution (C) as described above | 12.00 |
| Hexamethoxymethylmelamine, 75% solution in n-butanol ("Cymel" 300 ex. Cyanamid Co.) | 15.00 |
| p-Toluenesulphonic acid monohydrate, 50% solution in n-butanol | 0.87 |
| p-($C_{13}$—branched-chain alkyl) benzenesulphonic acid, 50% solution in n-butanol ("Arylan" SL 60 ex. Lankro Chemical Co.) | 2.6 |

In this composition, the acrylic resin (including the acrylic dispersing resin) and the hexamethoxymethylmelamine were present in the weight proportions 80.1:19.9 and the content of —$SO_3H$ group was approximately 0.9% of the combined weights of the acrylic resin and the hexamethoxymethylmelamine. The resulting paint was sprayed on to an undercoated steel panel, to which was affixed a strip of paper printed with alternating black and white checks, to a thickness just sufficient to obliterate the pattern. The panel was allowed to dry at room temperature for 18 hours. The film had then become hard enough to be handled without causing damage to the surface, had good gloss and was resistant to spotting with petrol.

EXAMPLE 2

This Example illustrates a pigmented room temperature-curing paint similar to that of Example 1, but employing different proportions of acrylic polymer to cross-linking agent.

Preparation of Pigment Dispersion

The procedure described in Example 1(B) was repeated but with the amounts of the ingredients adjusted to give the following final composition:

|  | Parts by weight |
|---|---|
| Titanium dioxide pigment | 56.92 |
| Indanthrone blue pigment | 1.42 |
| Acrylic dispersing resin (as referred to in Example 1(C); 100% solids) | 12.07 |
| Xylene | 29.59 |
|  | 100.00 |

Preparation of Light blue paint base

The following ingredients were cold-blended:

|  | Parts by weight |
|---|---|
| Pigment dispersion (as described above) | 445.50 |
| Acrylic resin solution (as described in Example 1(A).) | 431.00 |
| Acrylic dispersing resin (as referred to in Example 1(C); 50% solids in xylene) | 21.80 |
| Flow control additives | 18.00 |
| Xylene | 41.85 |
| Butyl acetate | 41.85 |
|  | 100.00 |

Preparation of Room Temperature-curing paint

The following ingredients were mixed together in the order given:

|  | Parts by weight |
|---|---|
| Light blue paint base (as described above) | 100.00 |
| Melamine-formaldehyde resin solution (as described below) | 40.00 |
| Acid catalyst solution (as described below) | 32.00 |
|  | 172.00 |

The resulting paint was applied to a panel and allowed to dry in the manner described in Example 1; a similar result to that described in Example 1 was obtained.

The melamine-formaldehyde resin solution used in the above formulation had the following composition:

|  | Parts by weight |
|---|---|
| Hexamethoxymethylmelamine ("Cymel" 301 ex. Cyanamid Co) | 50.00 |
| Aromatic hydrocarbon, boiling range 160–180° C.: aromatic content 96% | 25.00 |
| Butyl acetate | 15.00 |
| 2-Ethoxyethyl acetate | 10.00 |
|  | 100.00 |

The acid catalyst solution used in the above formulation had the following composition:

| | Parts by weight |
|---|---|
| p-Toluenesulphonic acid monohydrate | 2.44 |
| p-(C$_{13}$—branched-chain alkyl)-benzenesulphonic acid | 7.32 |
| Isopropanol | 50.13 |
| Aliphatic hydrocarbon, boiling range 100–120° C.: 5% aromatic content | 40.11 |
| | 100.00 |

In the above paint composition, the acrylic resin (including the acrylic dispersing resin) and the melamine-formaldehyde condensate were present in the weight proportions of 61.53:38.47 and the content of sulphonic acid group was 1.71% based on the total weight of acrylic resin and melamine-formaldehyde condensate.

EXAMPLE 3

This Example illustrates a similar composition to that of Example 2 but employing different pigmentation.

Preparation of Pigment Dispersion

The procedure of Example 1(B) was repeated, but with the following ingredient composition:

| | Parts by weight |
|---|---|
| Carbon black pigment | 8.24 |
| Acrylic dispersing resin (as referred to in Example 1(C); 100% solids) | 29.22 |
| Xylene | 62.54 |
| | 100.00 |

Preparation of Black Paint Base

The following ingredients were cold-blended:

| | Parts by weight |
|---|---|
| Pigment dispersion (as described above) | 236.8 |
| Acrylic resin solution (as described in Example 1(A),) | 571.8 |
| Acrylic dispersing resin (as referred to in Example 1(C); 50% solids in xylene) | 33.1 |
| Flow control additives | 24.3 |
| Xylene | 67.0 |
| Butyl acetate | 67.0 |
| | 1000.0 |

Preparation of Room temperature-curing paint

The following ingredients were mixed together in the order given:

| | Parts by weight |
|---|---|
| Black paint base (as described above) | 100.0 |
| Melamine-formaldehyde resin solution (as described in Example 2) | 51.2 |
| Acid catalyst solution (as described in Example 2) | 41.0 |
| | 192.2 |

The resulting paint was applied to a panel and allowed to dry in the manner described in Example 1, a similar result to that described in Example 1 was obtained.

In the above composition, the acrylic resin (including the acrylic dispersing resin) and the melamine-formaldehyde condensate were present in the weight proportions of 62.37:37.63 and the content of sulphonic acid group was 1.67% of the total weight of the acrylic resin and the melamine-formaldehyde condensate.

EXAMPLE 4

This Example illustrates the preparation of a "low-bake" paint composition corresponding to that of Example 2.

The following ingredients were mixed together in the order given:

| | Parts by weight |
|---|---|
| Light blue paint base (as described in Example 2) | 100.0 |
| Melamine-formaldehyde resin solution (as described in Example 2) | 40.0 |
| Acid catalyst solution (as described below) | 30.5 |

The resulting paint was applied to a panel in the manner described in Example 1, except that the coating was cured by heating at 60° C. for 30 minutes. The film was then hard enough to be handled, and it had good gloss and resistance to spotting with petrol.

The acid catalyst solution used in the above formulation had the following composition:

| | Parts by weight |
|---|---|
| p-Toluenesulphonic acid monohydrate | 1.26 |
| p-(C$_{13}$—branched-chain alkyl)-benzenesulphonic acid | 3.77 |
| Isopropanol | 52.76 |
| Aliphatic hydrocarbon, boiling range 100–120° C.; 5% aromatic content | 42.21 |
| | 100.00 |

In the above paint composition, the ratio of acrylic resin to melamine-formaldehyde condensate was the same as in Example 2; the content of sulphonic acid group was 0.84% of the total weight of the acrylic resin and melamine-formaldehyde condensate.

EXAMPLE 5

This Example illustrates the preparation of a "low-bake" paint composition corresponding to that of Example 3.

The following ingredients were mixed together in the order given:

| | Parts by weight |
|---|---|
| Black paint base (as described in Example 3) | 100.00 |
| Melamine-formaldehyde resin solution (as described in Example 2) | 51.2 |
| Acid catalyst solution (as described in Example 4) | 39.0 |

The resulting paint was applied to a panel in the same manner as that described in Example 4; similar results were obtained.

In the above paint composition, the ratio of acrylic resin to melamine-formaldehyde condensate was the same as in Example 3; the content of sulphonic acid group was 0.82% of the total weight of the acrylic resin and the melamine-formaldehyde condensate.

EXAMPLE 6

This Example illustrates the preparation of unpigmented room temperature-curing and "low-bake" curing paint compositions, suitable for application as "clears" over a pigmented basecoat.

Preparation of clear paint base

The following ingredients were cold-blended:

|  | Parts by weight |
|---|---|
| Acrylic resin solution (as described in Example 1(A),) | 59.50 |
| Acrylic dispersing resin (as referred to in Example 1(C); 50% solids solution in xylene) | 17.85 |
| Light protecting agents | 0.90 |
| Flow control additives | 1.91 |
| Butyl acetate | 9.92 |
| Xylene | 9.92 |
|  | 100.00 |

(i) Preparation of Room temperature-curing paint

The following ingredients were mixed in the order given:

|  | Parts by weight |
|---|---|
| Clear paint base | 100.0 |
| Melamine-formaldehyde resin solution (as described in Example 2) | 51.2 |
| Acid catalyst solution (as described in Example 2) | 41.0 |

The resulting clear paint was applied to a panel previously coated with a pigmented acrylic basecoat, and allowed to dry at room temperature for 18 hours. A film of good gloss and resistance to petrol spotting was obtained. The clear paint could be applied with similar results over a nitrocellulose or polyester basecoat.

In the above paint composition, the ratio of acrylic resin (including acrylic dispersing resin) to melamine-formaldehyde condensate was 63.3:36.7 and the sulphonic acid group content was 1.63% of the total weight of the acrylic resin and melamine-formaldehyde condensate.

(ii) Preparation of "low-bake" curing paint

The procedure described in (i) above was repeated, but reducing the amount of acid catalyst solution used to 39 parts by weight and curing the clear coat applied to the panel at a temperature of 60° C. for a period of 30 minutes. A similar result was obtained to that described in (i).

In this paint composition, the ratio of acrylic resin to melamine-formaldehyde condensate was the same as in (i) but the sulphonic acid group content was 0.80%.

EXAMPLE 7

This Example illustrates the preparation of metallic pigmented room temperature-curing and "low-bake" curing paint compositions.

Preparation of Aluminium Dispersion

The following ingredients were blended in the manner described in Example 1(B):

|  | Parts by weight |
|---|---|
| Aluminum paste (70% in aliphatic hydrocarbon) | 35.00 |
| Acrylic dispersing resin (as referred to in Example 1(C); 100% solids) | 22.50 |
| Xylene | 42.50 |
|  | 100.00 |

Preparation of "Bentone" Dispersion

The following ingredients were blended in the manner described in Example 1(B):

|  | Parts by weight |
|---|---|
| "Bentone" 38 | 5.20 |
| Acrylic dispersing resin (as referred to in Example 1(C); 100% solids) | 23.65 |
| Xylene | 71.15 |
|  | 100.00 |

"Bentone" is a Registered Trade Mark.

Preparation of Blue Pigment Dispersion

The following ingredients were blended in the manner described in Example 1(B):

|  | Parts by weight |
|---|---|
| Phthalocyanine blue pigment | 12.85 |
| Acrylic dispersing resin (as referred to in Example 1(C); 100% solids) | 16.82 |
| Xylene | 70.33 |
|  | 100.00 |

(i) Preparation of Silver paint base

The following ingredients were cold-blended:

|  | Parts by weight |
|---|---|
| Aluminium dispersion (as described above) | 7.23 |
| "Bentone" dispersion (as described above) | 6.22 |
| Acrylic dispersing resin (as referred to in Example 1(C); 50% solids solution in xylene) | 6.72 |
| Acrylic resin solution (as described in Example 1(A) | 42.80 |
| Cellulose acetate-butyrate solution (30% solids in 1:1 butyl acetate/2-ethoxyethylacetate) | 15.69 |
| Flow control additives | 2.76 |
| Xylene | 9.29 |
| Butyl acetate | 9.29 |

| Parts by weight |
|---|
| 100.00 |

(i) (a) Preparation of room temperature-curing silver metallic paint

The following ingredients were mixed in the order given:

| | Parts by weight |
|---|---|
| Silver paint base (as described above) | 100.00 |
| Melamine-formaldehyde resin solution (as described in Example 2) | 51.3 |
| Acid catalyst solution (as described in Example 4) | 78.0 |

The resulting paint was applied by spraying on to an undercoated steel panel and the coating was allowed to dry at room temperature for 18 hours. The film obtained had a good metallic appearance, good gloss, and good resistance to petrol spotting.

(i) (b) Preparation of "low-bake" curing silver metallic paint

The following ingredients were mixed in the order given:

| | Parts by weight |
|---|---|
| Silver paint base (as described above) | 100.00 |
| Melamine-formaldehyde resin solution (as described in Example 2) | 51.3 |
| Acid catalyst solution (as described in Example 4) | 39.0 |

The resulting paint was applied to an undercoated panel as described in (i)(a) above, except that the coating was cured by heating at 60° C. for 30 minutes Similar results to those of (i)(a) were obtained.

In the above paint compositions (i)(a) and (i)(b), the ratio of acrylic resin (including acrylic dispersing resin) to melamine-formaldehyde condensate was 55.35:44.65 in both cases; the contents of sulphonic acid group were 1.95% and 0.98% respectively.

(ii) Preparation of dark blue metallic paint base

The following ingredients were mixed in the order given:

| | Parts by weight |
|---|---|
| Blue pigment dispersion (as described above) | 31.68 |
| Aluminium dispersion (as described above) | 3.88 |
| "Bentone" dispersion | 3.33 |
| Acrylic resin solution (as described in Example 1(A).) | 46.76 |
| Cellulose acetate butyrate solution (30% solids in 1:1 butyl acetate/2-ethoxyethyl-acetate) | 6.55 |
| Flow control additives | 2.08 |
| Butyl acetate | 2.86 |
| 2-ethoxyethyl acetate | 2.86 |

| Parts by weight |
|---|
| 100.00 |

(ii)(a) Preparation of room temperature curing dark blue metallic paint

The following ingredients were mixed in the order given:

| | Parts by weight |
|---|---|
| Dark blue metallic paint base (as described above) | 100.00 |
| Melamine-formaldehyde resin solution (as described in Example 2) | 51.00 |
| Acid catalyst solution (as described in Example 4) | 77.5 |

The resulting paint was applied as described in (i)(a) above, with similar results.

(ii)(b) Preparation of "low-bake" dark blue metallic paint

The following ingredients were blended in the order given:

| | Parts by weight |
|---|---|
| Dark blue metallic paint base (as described above) | 100.00 |
| Melamine-formaldehyde resin solution (as described in Example 2) | 51.0 |
| Acid catalyst solution (as described in Example 4) | 39.0 |

The resulting paint was applied as described in (i)(b) above, with similar results.

In the above paint compositions (ii)(a) and (ii)(b), the ratio of acrylic resin (including acrylic dispersing resin) to melamine-formaldehyde condensate was 57.62:42.38 in both cases; the contents of sulphonic acid group were 1.85% and 0.93% respectively.

EXAMPLE 8

The following Example compares the effect upon film properties of the use as curing catalysts of two acid blends according to the invention and of the individual components of each blend alone. In each case, two comparisons were made, with a light beige solid colour paint and a blue metallic pigmented paint respectively, both being formulated to cure at room temperature.

A(1) Preparation of Light Beige Paint base

The following ingredients were blended:

| | Parts by weight |
|---|---|
| Titanium dioxide pigment | 23.50 |
| Iron oxide (yellow) pigment | 0.66 |
| Iron oxide (red) pigment | 0.26 |
| Carbon black pigment | 0.08 |
| Acrylic dispersing resin (as described in Example 1) | 13.55 |
| Xylene | 9.70 |
| Butyl acetate | 3.49 |
| Acrylic resin solution (as described in Example 1) | 45.39 |

| | Parts by weight |
|---|---|
| Additives (flow control and anti-settling aids) | 3.37 |
| | 100.00 |

A(2) Preparation of Blue Metallic Paint base

The following ingredients were blended

| | Parts by weight |
|---|---|
| Carbon black pigment | 0.04 |
| Phthalocyanine blue pigment | 0.27 |
| Aluminium paste | 3.12 |
| Acrylic dispersing resin (as described in Example 1) | 8.51 |
| Acrylic resin solution (as described in Example 1) | 40.80 |
| Xylene | 17.41 |
| Butyl acetate | 13.33 |
| Ethoxol acetate | 6.37 |
| Cellulose acetate butyrate resin | 5.46 |
| Bentone 38 | 0.09 |
| Additives (flow control and anti-settling aids) | 4.30 |
| | 100.00 |

B Preparation of Acid Catalyst Solutions (a) The following standard solvent mixture was used for each of the acid solutions:

| | Parts by weight |
|---|---|
| Isopropanol | 903.0 |
| Aliphatic hydrocarbon, boiling range 138–165° C. | 451.0 |
| Aliphatic hydrocarbon, boiling range 98–122° C. | 451.0 |
| (b) The following acid solutions were prepared:- | |
| (i) p-Toluenesulphonic acid | 5.6 |
| Solvent mixture (a) | 100.0 |
| (ii) "Arylan" SL60 | 15.6 |
| Solvent mixture (a) | 100.0 |
| (iii) p-Toluenesulphonic acid | 2.7 |
| "Arylan" SL60 | 8.1 |
| Solvent mixture (a) | 100.0 |
| (iv) "Nacure" 155 | 14.4 |
| Solvent mixture (a) | 100.0 |
| (v) p-Toluenesulphonic acid | 2.7 |
| "Nacure" 155 | 7.4 |
| Solvent mixture (a) | 100.0 |

C. Preparation of Room-temperature Curing Paints

A series of paints was made up according to the following general formulations, using each of the acid catalyst solutions described in (B) in turn:

| | Parts by weight |
|---|---|
| Solid Colour Paint | |
| Light beige paint base | 100.0 |
| Hexamethoxymethylmelamine, ("Cymel" 301), 50% solution in solvent mixture shown in Example 9(A) below. | 51.2 |
| Acid catalyst solution | 41.0 |
| Acetone | 41.2 |
| Metallic Paint | |
| Blue metallic paint base | 100.0 |
| Hexamethoxymethylmelamine, ("Cymel" 301), 50% solution in solvent mixture shown in Example 9(A) below. | 51.2 |
| Acid catalyst solution | 41.0 |
| Acetone | 41.2 |

D. Application of Paints and Test Procedure

For the determination of drying times, petrol resistance and hardness, each paint, as described in (C) above, was applied using a 0.008" film spreader, to a clear glass panel by means of an automatic spreading machine.

For the determination of gloss, adhesion and water resistance each paint was similarly applied to a pretreated, undercoated steel panel.

Drying time measured was the time required for a paint film to become tack-free to the touch at 20° C.

Petrol resistance was determined on the paint film aged for 24 hours or 48 hours, by application to it at 20° of two drops of "Shell" 4-star petrol. Any lifting of the film, and the time from application of the petrol which elapsed before it occurred, was noted; if no lifting had occurred after approximately 20 minutes, the film was wiped clean and examined for softening, swelling or staining. The test was repeated on the film after ageing for 1 week.

Hardness of the paint film was determined using an Erichsen König pendulum instrument, as described in "Paint Testing Manual" (ed. G. G. Sward: ASTM Special Technical Publication 500, 13th Edition, Philadelphia 1972: p. 286). The test was performed 24 hours and 1 week respectively after application.

Gloss was measured, using a Sheen Instruments digital 45° gloss meter, at 24 hours and 1 week respectively after application.

Cross-hatch adhesion was tested by the following procedure.

A scalpel was used to make six parallel cuts approximately 2.4 mm apart in the paint film. A further six cuts were made at right angles to the first cuts, such that a grid of 25 squares are formed. A piece of adhesive tape, of the non-release variety, was applied to the pattern. Good adhesion was assured by rubbing with a rubber eraser. The tape was then removed by tugging at the free end. Panels were assessed for the proportion of paint remaining within the hatched pattern.

"Gravellometer" Test The steel panel coated with the paint film was held inclined at an angle of 45° beneath a vertical tube of 4.5 m length and 50 mm internal diameter. 500 g of ¼" steel ball bearings were then dropped, all at once, down the tube onto the panel. The paint film was assessed for adhesion.

Water-Resistance Tests (a) The warm water soak test conformed to Society of Motor Manufacturers and Traders Test 57, and involved immersion of the steel panel carrying the paint film and backed with a water-resistant paint, into a bath containing circulating distilled water maintained at 38° C. for 250 hours. The panels were periodically assessed for gloss, staining and blistering. The degree of blistering was assessed according to the scale described in British Standard AU148 Pt II (1969).

(b) Cold Water Spray Test: Panels were placed in an enclosure and sprayed with distilled water maintained at 4° C. during 500 hours. The panels were assessed as in the warm water soak test.

The results of all the foregoing tests are shown in the accompanying Table I.

EXAMPLE 9

In this Example, the effect upon film properties is compared of the use of different alkylated melamine-formaldehyde reaction products.

A. Preparation of Melamine-formaldehyde Resin Solutions (a) The following standard solvent mixture was used for each of the resin solutions:

|  | Parts by weight |
|---|---|
| Aromatic hydrocarbon, boiling range 157–180° C. | 25.0 |
| Butyl acetate | 15.0 |
| Aromatic hydrocarbon, boiling range 192–208° C. | 8.0 |
| Pine Oil | 2.0 |

(b) The following resin solutions were prepared:

|  | Parts by weight |
|---|---|
| (i) "Cymel" 301 | 50 |
| Solvent mixture (a) described above | 50 |
| (ii) "Cymel" 1130 (essentially hexamethoxymethylmelamine) | 50 |
| Solvent mixture (a) | 50 |
| (iii) Methylated/butylated melamine-formaldehyde resin | 50 |
| Solvent mixture (a) | 10 |
| (iv) Isopropylated melamine-formaldehyde resin | 50 |
| Solvent mixture (a) | 16 |
| (v) "Maprenal" MF 650* (an isobutylated melamine-formaldehyde resin) | 50 |
| Solvent mixture (a) | 5 |

(*"Maprenal" is a Registered Trade Mark of Hoechst AG.)

B. Preparation of Room-temperature Curing Paint

A series of paints was made up according to the following general formulation, using each of the melamine-formaldehyde resin solutions described in (A) in turn:

|  | Parts by weight |
|---|---|
| Light beige paint base (as described in Example 8(A) | 100.0 |
| Melamine-formaldehyde resin solution | 51.2 |
| Acid catalyst solution (as described in Example 8(B) (b) (iii).) | 41.0 |
| Acetone | 41.2 |

C. Application of Paints and Testing

Each of the paints made up as in (B) above was applied to glass and steel panels and tested as described in Example 8(D). The results are shown in the accompanying Table II.

EXAMPLE 10

In this Example, a comparison is made of three compositions according to the invention, based on different hydroxyl group-containing polymers.

A. Preparation of Hydroxyl group-containing Polymers (i) The preparation of the Acrylic Resin Solution (A) of Example 1 was repeated.

(ii) The preparative procedure of Example 1(A) was repeated, but employing the following monomer mixture in place of the one there described:

|  | Parts by weight |
|---|---|
| Methyl methacrylate | 41.3 |
| 2-Ethylhexyl acrylate | 27.5 |
| 2-Hydroxyethyl methacrylate | 31.2 |
|  | 100.0 |

The resulting resin solution had a solids content of 60%. The proportions of the constituent monomers as shown above were chosen so that the resin would have the same hydroxyl value and glass transition temperature as the resin described in Example 1.

(iii) The preparative procedure of Example 1(A) was repeated, but employing the following monomer mixture in place of the one there described:

|  | Parts by weight |
|---|---|
| Methyl methacrylate | 43.1 |
| 2-Ethylhexylacrylate | 22.4 |
| 2-Hydroxyisopropylmethacrylate | 34.5 |
|  | 100.0 |

The resulting resin solution had a solids content of 50% and the resin had a hydroxyl value of 137 mg KOH/g (non-volatile). The glass transition temperature of the resin was calculated to be 29° C.

B. Preparation of Pigment Dispersion

The procedure described in part B of Example 1 was repeated with the following ingredients:

|  | Parts by weight |
|---|---|
| Phthalocyanine blue pigment | 3.9 |
| Titanium dioxide pigment | 568.8 |
| Hydrated iron oxide pigment | 3.5 |
| Carbazole dioxazine violet pigment | 0.2 |
| "Bentone" | 6.5 |
| Acrylic dispersing resin (as in Example 1) | 95.0 |
| Xylene | 325.0 |
|  | 1002.9 |

C. Preparation of Paint Base

The following ingredients were cold-blended to produce a series of three paint bases:

|  | Parts by weight | | |
|---|---|---|---|
| Pigment dispersion (as in (B) above) | 201 | 201 | 201 |
| Acrylic dispersing resin (as described in Example 2 of British Specification No. 1393243: 50% solids in xylene) | 36 | 36 | 36 |

-continued

| | Parts by weight | | |
|---|---|---|---|
| Hydroxyl group-containing polymer (as in (A) (i) above.) | 212 | — | — |
| polymer (as in (A) (ii) above.) | — | 212 | — |
| polymer (as in (A) (iii) above.) | — | — | 254 |
| Additives (flow-control and anti-settling aids) | 9 | 9 | 9 |

Each of the resulting paint bases was then thinned with a 1:1 mixture of butyl acetate and xylene to a viscosity of 2.2 poise (measured on a cone-and-plate viscometer).

D. Preparation of Room temperature-curing Paints

From each of the three paint bases described in (C), a paint was made up according to the following formulation:

| | Parts by weight |
|---|---|
| Paint base (as non-volatile solids) | 58 |
| Hexamethoxymethylmelamine solution (as described in Example 2) | 51.2 |
| Acid catalyst solution (as described in Example 8 (B) (b) (iii).) | 41.0 |
| Acetone | 41.2 |

E. Application of Paints and Testing

Each of the paints made up as in (D) above was applied to glass and steel panels and tested as described in Example 8(D). The results are shown in the accompanying Table III.

TABLE 1
(Example 8)

| Acid catalyst solution | Paint type* | Drying time (minutes) | Petrol resistance 48 hours | Petrol resistance 1 week | Gloss at 45° (%) 24 hrs | Gloss at 45° (%) 1 week | Hardness 24 hrs | Hardness 1 week | Cross-hatch & Gravelometer. | Water resistance General appearance | Water resistance Blistering | Cold Water Spray General appearance | Cold Water Spray Blistering |
|---|---|---|---|---|---|---|---|---|---|---|---|---|---|
| i. | S | >140 | Lifted after 5 minutes | ALL SAT-IS-FACT-TORY | 100 | 91 | 48 | 112 | ALL SAT-ISFACT-ORY AT 1 DAY AND 1 WEEK | Loss of gloss, whitening. | 1 day: 10/few 10 days: 5/few | Loss of gloss | 4 days: 10/few 21 days: 8/few |
| | M | 70 | Loss of gloss. | | 77 | 62 | 96 | 155 | | Loss of gloss, severe staining | 4 days: 7/few 10 days: 5/few | Loss of gloss | 11 days: 10/few 21 days: 8/few |
| ii. | S | 49 | Soft after 20 minutes | | 85 | 82 | 59 | 90 | | Loss of gloss | 10 days: 9/few | Loss of gloss | — |
| | M | 40 | Loss of gloss | | 57 | 46 | 112 | 174 | | Loss of gloss | Con-tami-nation blisters only | Loss of gloss | Edge blisters only at 21 days |
| iii. | S | 85 | Soft after 20 minutes | | 97 | 89 | 62 | 90 | | Loss of gloss, whitening | 1 day: 10/few 10 days: 5/few | Slight loss of gloss | 21 days: 9/few |
| | M | 42 | Loss of gloss. | | 62 | 52 | 103 | 151 | | Loss of gloss | 10 days: 6/few | Loss of gloss | Micro-blisters at 21 days |
| iv. | S | >140 | Lifted after 2 minutes. | | 100 | 96 | 43 | 132 | | Loss of gloss | 4 days: 10/very few | Slight loss of gloss | Edge blisters at |
| | M | 105 | Lifted after 5 minutes. | | 81 | 70 | 110 | 146 | | Loss of gloss | 10 days: 7/few Con-tami-nation blisters. | Slight loss of gloss | Edge blisters only |
| v. | S | >140 | Swollen after 20 minutes. | | 105 | 99 | 45 | 107 | | Marked loss of gloss, whitening. | 1 day: 10/few 10 days: 5/few | Slight loss of gloss | Edge blisters only |
| | M | 100 | Swollen after 20 minutes. | | 81 | 70 | 88 | 159 | | Loss of gloss, staining. | 10 days: 7/very few | Slight loss of gloss | Edge blisters only |

*S = solid colour
M = metallic

TABLE II (Example 9)

| Melamine-formaldehyde resin solution. | Drying time (minutes) | Petrol resistance 24 hours | Petrol resistance 1 week | Gloss at 45° (%) 24 hours | Gloss at 45° (%) 1 week | Hardness 24 hours | Hardness 1 week | Cross-hatch and "Gravelo-meter" | Water resistance General appearance. | Water resistance Blistering | Cold Water Spray General appearance | Cold Water Spray Blistering |
|---|---|---|---|---|---|---|---|---|---|---|---|---|
| (i) | 75 | Lifted after 10 minutes. | Un-marked. | 95 | 89 | 55 | 120 | ALL GOOD AT 1 DAY AND 1 WEEK | Loss of gloss, whitening. | 7 days: 7/few. 10 days: 7/few. | Loss of gloss | Edge blisters at 21 days. |
| (ii) | 55 | Lifted after 4 minutes. | Very slight staining. | 93 | 89 | 62 | 138 | | Some loss of gloss less severe than in (i), whitening. | 10 days: 10/very few. | Good | — |
| (iii) | No cure at room temperature. | Dissolved | Lifted after 5 minutes | — | — | 39 | 104 | | — | — | — | — |
| (iv) | 75 mins. | Lifted after 4 minutes. | Un-marked. | 96 | 90 | 61 | 117 | | Loss of gloss, whitening. | 7 days: 5/few. 10 days: 5/few-medium. | Gloss good. | 14 days: heavy contamination blistering. 21 days: 7/medium |
| (v) | No cure at room temperature. | Dissolved | Dissolved | — | — | 40 | 78 | | — | — | — | — |

TABLE III (Example 10)

| Hydroxylic polymer | Drying time (mins) | Petrol resistance 48 hours | Petrol resistance 1 week | Gloss at 45°, (%) 24 hours | Gloss at 45°, (%) 1 week | Hardness 24 hours | Hardness 1 week | Cross-hatch and "Gravelo-meter" | Water resistance General appearance | Water resistance Blistering | Cold Water Spray General appearance | Cold Water Spray Blistering |
|---|---|---|---|---|---|---|---|---|---|---|---|---|
| (i) | 65 | Lifted after 15 mins. | ALL UN-MARKED | 105 | 98 | 64 | 92 | ALL GOOD AT 1 DAY AND 1 WEEK | Loss of gloss, whitening | Edge blisters at 7 days | Loss of gloss | 7 days: 9/few. 10 days: 7/few. |
| (ii) | 55 | Slightly swollen after 25 mins. | | 102 | 95 | 63 | 101 | | Loss of gloss, whitening | 2 days: 8/few. 4 days: 7/few. 7 days: 7/few. | Loss of gloss. | 7 days: 9/medium dense. 10 days: 7/medium dense. |
| (iii) | 40 | Virtually un marked | | 92 | 88 | 83 | 126 | | Loss of gloss, whitening | 1 day: 6/few. 4 days: 5/few. 7 days: 5/few. | Loss of gloss | 7 days: 9/medium dense. 10 days: 7/medium dense. |

We claim:

1. A coating composition comprising:
   (i) from 90% to 50% by weight of a hydroxyl group-containing addition polymer obtained by the copolymerisation of α,β-ethylenically unsaturated monomers including at least one hydroxyalkyl ester of an α,β-ethylenically unsaturated carboxylic acid;
   (ii) from 10% to 50% by weight of a crosslinking agent consisting of a substantially fully alkylated melamine-formaldehyde reaction product in which the alkyl groups contain from 1 to 4 carbon atoms; and
   (iii) an acid catalyst consisting of a blend of an alkylated arylsulphonic acid in which the or each alkyl group contains from 1 to 3 carbon atoms and an alkylated arylsulphonic acid in which the or each alkyl group contains from 8 to 14 carbon atoms, such that the total content of sulphonic acid (—SO$_3$H) group is in the range 0.70% to 2.1% of the total weight of constituents (i) and (ii).

2. A composition as claimed in claim 1, wherein the hydroxyl group-containing addition polymer is an acrylic resin obtained by the polymerisation or copolymerisation of at least one hydroxyalkyl ester selected from 2-hydroxyethyl acrylate, 2-hydroxyethyl methacrylate, 2-hydroxypropyl acrylate, 2-hydroxypropyl methacrylate, and mixtures thereof, and 4-hydroxybutyl methacrylate.

3. A composition as claimed in claim 1 or claim 2, wherein the monomers from which the hydroxyl group-containing polymer is derived include a carboxyl group-containing monomer.

4. A composition as claimed in any one of claims 1 to 3, wherein the hydroxyl group-containing polymer is obtained by the copolymerisation of:

(a) a monomer which is the 1:1 molar adduct either of an α,β-ethylenically unsaturated carboxylic acid with the glycidyl ester of a tertiary aliphatic carboxylic acid or of the glycidyl ester of an α,β-ethylenically unsaturated carboxylic acid with a tertiary aliphatic carboxylic acid, (b) a hydroxyalkyl ester of an α,β-ethylenically unsaturated carboxylic acid and (c) one or more α,β-ethylenically unsaturated monomers free from hydroxyl groups, the said adduct being formed before, during or after the copolymerisation reaction.

5. A composition as claimed in any one of claims 1 to 4, wherein the hydroxyl group-containing addition polymer has a hydroxyl value in the range 70–200 mg KOH/g, a glass transition temperature in the range $-20°$ to $+40°$ C., and a molecular weight in the range 5,000–30,000.

6. A composition as claimed in any one of claims 1 to 5, wherein the alkylated melamine-formaldehyde reaction product consists predominantly of hexamethoxymethylmelamine.

7. A composition as claimed in any one of claims 1 to 6, wherein the alkylated arylsulphonic acid in which the or each alkyl group contains from 1 to 4 carbon atoms is selected from p-toluenesulphonic acid, xylenesulphonic acids, ethylbenzenesulphonic acids and methylnaphthalenesulphonic acids.

8. A composition as claimed in any one of claims 1 to 7, wherein the alkylated arylsulphonic acid in which the or each alkyl group contains from 8 to 14 carbon atoms is selected from p-octylbenzenesulphonic acid, p-dodecylbenzenesulphonic acid, $C_{13}$ branched-chain alkylbenzenesulphonic acid and di($C_9$-alkylated)naphthalenedisulphonic acid.

9. A composition as claimed in claim 7 or claim 8, wherein the acid catalyst consists of a blend of p-toluenesulphonic acid and $C_{13}$ branched-chain alkylbenzenesulphonic acid.

10. A coating upon a substrate obtained by applying to the substrate a composition as claimed in any one of claims 1 to 9, and allowing the composition to cure at room temperature.

11. A coating upon a substrate obtained by applying to the substrate a composition as claimed in any one of claims 1 to 9 and curing the composition by heating to about 60° C.

* * * * *